United States Patent [19]

Anderson et al.

[11] Patent Number: 4,484,304
[45] Date of Patent: Nov. 20, 1984

[54] TRANSACTION EXECUTION SYSTEM HAVING KEYBOARD AND MESSAGE CUSTOMIZATION, IMPROVED KEY FUNCTION VERSATILITY AND MESSAGE SEGMENTATION

[75] Inventors: Robert W. Anderson, Morgan Hill; May L. Gee, San Jose, both of Calif.; Alice K. McMullen, Charlotte, N.C.

[73] Assignee: International Business Machines Corporation, Armonk, N.Y.

[21] Appl. No.: 311,372

[22] Filed: Oct. 14, 1981

Related U.S. Application Data

[62] Division of Ser. No. 009,384, Feb. 2, 1979, Pat. No. 4,319,336.

[51] Int. Cl.³ .......................... G06F 3/04; G06F 3/14
[52] U.S. Cl. .................................... 364/900; 235/380
[58] Field of Search ............... 364/200, 900; 235/380, 235/381; 340/825.55, 711, 379

[56] References Cited

U.S. PATENT DOCUMENTS

| | | | |
|---|---|---|---|
| 3,469,243 | 9/1969 | Willcox et al. | 340/825.55 |
| 3,500,327 | 3/1970 | Belcher et al. | 340/825.55 X |
| 3,852,571 | 12/1974 | Hall et al. | 235/380 |
| 3,943,335 | 3/1976 | Kinker et al. | 235/379 |
| 4,134,537 | 1/1979 | Glaser et al. | 235/381 |
| 4,186,871 | 2/1980 | Anderson et al. | 235/380 X |
| 4,438,326 | 3/1984 | Uchida | 235/380 |

Primary Examiner—Harvey E. Springborn
Attorney, Agent, or Firm—Shelley M. Beckstrand

[57] ABSTRACT

A transaction execution system is provided in which key initiated transaction requests at a terminal remote from and in communication with a host data processing system are processed at the terminal under the selective control of the host. Each active transaction key at the terminal keyboard is assigned one of three different states by a financial institution table. Transactions requested by keys having a data entry state are handled within the terminal and with the additional consumer entered data required to complete the transaction being requested by and received by the terminal using sets of messages previously stored in the terminal by the host data processing system. Transactions designated by an interactive key state take place within and involve interactive communication between both the terminal and the host, enabling the responses and other communications generated by the host in connection with a transaction for a particular customer to be customized. Message storage within the terminal and communication of messages to the terminal from the host are greatly simplified by storage of segments of messages at the terminal. Frequently repeated phrases can then be incorporated into a message as it is readied for display at the terminal by storing the phrases as segments and thereafter simply identifying them in message definitions communicated to the terminal from the host or stored at the terminal.

7 Claims, 9 Drawing Figures

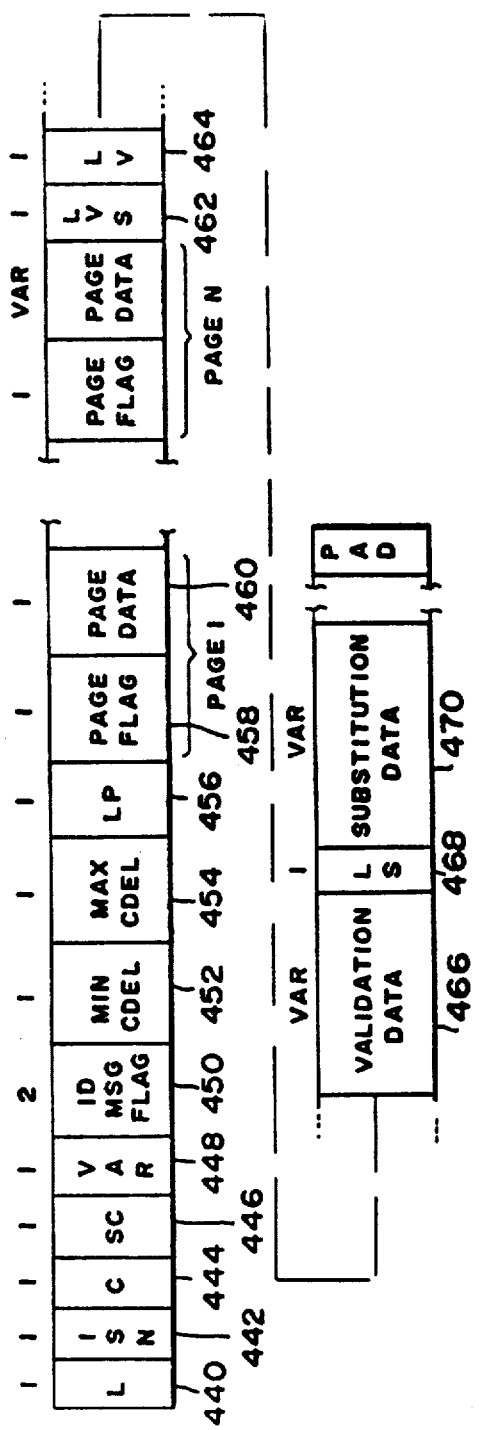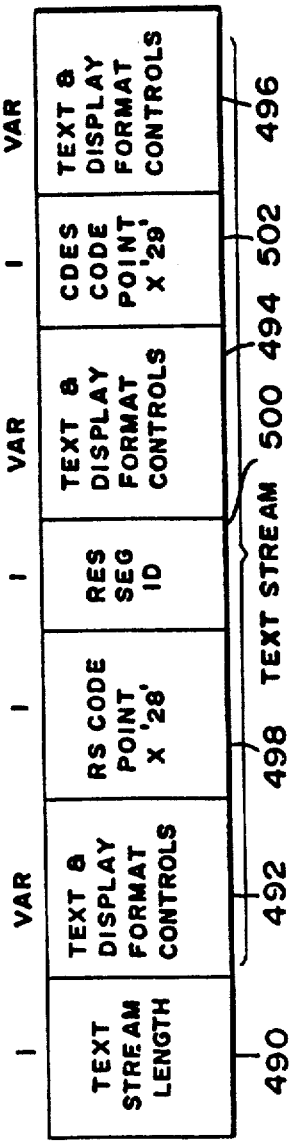

FIG. 21
CHANGE DISPLAY MESSAGE COMMAND FORMAT

| L | N | C | SC | C2 | C/SC | C1 | SPEC | MN | ML | MSG | FLAG | IMI |
|---|---|---|----|----|------|----|------|----|----|----|------|-----|
| 750 | 752 | 754 | 756 | 758 | 760 | 762 | 764 | 766 | 768 | 770 | 772 | 774 |

FIG. 22

| L (16) | NP | NRS | - | CDES | NL | NRS | 3 | RS | 6 | RS | 5 | RS | 4 | RS | 2 |
|--------|----|----|---|------|----|----|---|----|---|----|---|----|---|----|---|
| 800 | 802 | 804 | 806 | 808 | 810 | | | | | | | | | | |

TRANSACTION EXECUTION SYSTEM HAVING KEYBOARD AND MESSAGE CUSTOMIZATION, IMPROVED KEY FUNCTION VERSATILITY AND MESSAGE SEGMENTATION

This is a division of application Ser. No. 009,384 filed Feb. 2, 1979, now U.S. Pat. No. 4,319,336.

BACKGROUND OF THE INVENTION

1. Field of the Invention

This invention relates to transaction execution systems, and more particularly to such systems having a central data base at a host data processing system in communication with remote terminals to permit the execution of transactions such as the issuance of cash or the inter-account transfer of funds in response to entry of a personal identification number together with a machine-readable identification card issued by any one of a plurality of cooperating institutions, 2. History of the Prior Art Transaction execution systems which enable the performance of transactions such as cash issuance at terminals remote from and in communication with a host data processing system having a central data base in which account and other information is stored are well known. Examples of such systems are provided by U.S. Pat. No. 3,956,615 of Anderson et al, U.S. Pat. No. 3,970,992 of Boothroyd et al, U.S. Pat. No. 3,937,925 of Boothroyd, U.S. Pat. No. 3,931,497 of Gentile et al, U.S. Pat. No. 4,004,134 of Hwang, U.S. Pat. No. 4,023,014 of Goldberg, U.S. Pat. No. 4,025,760 of Trenkamp, U.S. Pat. No. 4,023,013 of Kinker, U.S. Pat. No. 3,727,186 of Stephenson, Jr., et al, U.S. Pat. No. 4,091,448 of Clausing, and U.S. Pat. No. 4,186,871 of Anderson, et al.

The various transaction execution systems described in the above-noted patents and application constitute a variety of different approaches to the problem of providing a secure and yet versatile transaction to take place at any one of the terminals remote from the host data processing system. For example, in U.S. Pat. No. 3,956,615 of Anderson et al which is commonly assigned with the present application, various transactions are performed at the terminal upon verification of the propriety of the transaction and the authenticity of the consumer based on entry of a credit card identifying the consumer and an issuing financial institution and entry of a personal identification number (PIN) by the consumer. The system verifies the personal identification number with identification information on the credit card using an encryption code determined by the financial institution identified by the card. In an improvement on that system which is described in U.S. Pat. No. 4,186,871 on Anderson et al, the host data processing system includes a virtual financial institution table (VFIT). Upon entry by a consumer of a credit card and personal identification number of the financial institution table (FIT) within the terminal is searched in an attempt to locate an entry corresponding to the institution identified by the credit card. If a corresponding entry is located, data from the fields for that entry is used to encrypt the personal data from the credit card for purposes of verification of the personal identification number entered by the consumer. If a corresponding entry is not located in the financial institution table, a search of the virtual financial institution table at the host is made. If a corresponding entry is located in the virtual financial institution table, the included data is communicated back to the terminal where it is used in the verification of the personal identification number. The Clausing patent provides an example of a system where time sharing of a central processor or a local processor serving one or a handful of terminals is utilized to execute transaction requests. In the former case transactions are executed at the central processor on an on-line basis, which in the latter case transactions are executed at the regional or local processor on an off-line basis.

Transaction execution systems provide one solution to the persistent problem of how to provide the customers of a financial institution with more functions without substantially increasing costs. Such systems attempt to solve this problem by automating simple functions like cash withdrawal, deposit and the like so as to reduce the time that the customer must spend with a teller. This reduces the number of tellers an institution needs, and accordingly the costs. If the transaction execution system can provide enough functions, it can even reduce the number of branches of the financial institution which are needed, in addition to extending the institution's banking hours for normal transactions without actually increasing the number of hours that the buildings themselves must be kept open.

Considering these objectives present transaction execution systems suffer from a number of limitations which limit their versatility and applicability to a variety of different situations. For example, conventional systems are limited in the number and types of functions that they can perform. Transactions such as bill paying which require transfer of funds between accounts are extremely difficult if not impossible to perform. Further problems arise from the fact that a financial institution wishing to enable its customers to perform functions different from those permitted by other institutions sharing the same system must typically acquire its own terminal system including controller. This is quite wasteful when it is considered that a number of financial institutions can otherwise share the same terminal system by accepting a standard set of key functions and display messages. The key functions themselves are limited so that even in instances where an institution can customize the available transactions and messages the number and types of functions are still unduly limited. Most systems limit performance of the functions to the terminal level, and in the process fail to provide the type of communication with the terminal or information storage within the terminal which enables such things as repeated interchange of data requests and data entries between the terminal and attached consumer operated keyboards, displays customized for a particular institution or customer and other activities capable of customization for the institution or consumer. Those conventional systems which permit communication between the terminal and the host data processing system during execution of the transactions tend to limit the interchange of information between the two because of such things as time and storage constraints so as to again limit the type and variety of functions capable of being performed. One such problem relates to the transmission of lengthy display messages from the host to the terminal during transaction execution. Because of this problem a number of predetermined standard messages must typically be stored in the terminal during initialization of the system, with the system thereafter relying on the standard messages stored in the terminal for communication with the consumer during execution of the transactions.

In such systems the ability to communicate between the host and the consumer on a going, on-line basis and to compose messages custom-designed for a particular consumer or institution is lacking.

Accordingly, it is an object of the invention to provide an improved transaction execution system.

It is a further object of the invention to provide a transaction execution system capable of greater and more varied functions. This object includes the ability to provide a variety of diverse functions to be performed at the terminal complete with a full interchange of data between the terminal and consumer, as well as the ability to utilize the host data processing system when necessary to accomplish certain functions.

Further objects in accordance with the invention include the ability to customize display messages to a particular consumer during various transactions.

Still further objects in accordance with the invention include the ability to communicate messages between the host and the terminal in simplified form so as to minimize the transmission time involved in addition to the storage space required, particularly at the terminal where messages are desirably stored for use in providing displays to consumers as needed.

BRIEF DESCRIPTION OF THE INVENTION

The present invention provides an improved transaction execution system in which institutional key-initiated transactions and responses to individual consumers can be customized and in which a variety of diverse transactions can be performed at the terminal level or with the active participation of the host data processing system using a minimum of communications and storage for multiline, customized messages.

Communication of messages from the host to the terminal as well as storage of the messages in the terminal is greatly facilitated by a segmentation technique in which segments comprising commonly occurring portions of messages are stored in the terminal prior to execution of the various requested transactions. Each segment which typically comprises a plurality of displayable characters and format characters indicating the physical location of the displayable characters is stored in a segment table within the terminal. A typical display message includes displayable characters representing a unique or customized part of the message together with format characters defining the desired physical location of the displayable characters and an identification of one or more segments to be incorporated into the message. During display of a message stored at the terminal or sent to the terminal from the host, the displayable characters are displayed using a dot matrix or other appropriate character generation technique in conjunction with conventional multiline display apparatus. Each time a segment identifier is encountered within the message, character generation shifts to a segment table from which the various characters of the segment are converted into displayable characters using the format characters. Each message may also include one or more indicators of consumer entered data which cause the character generation process to shift to a table where consumer entered data is stored. In this way consumer entered data can be made a part of the display messages such as where verification of the consumer entered data is requested.

BRIEF DESCRIPTION OF THE DRAWINGS

In the accompanying drawings forming a material part of this disclosure:

FIG. 14 is a diagrammatic representation of an interactive display message from the host data processing system to the terminal in the arrangement of FIG. 1B;

FIG. 15 is a diagrammatic representation of page description fields within the interactive display message of FIG. 14;

FIG. 21 is a diagrammatic representation of a change display message command from the host data processing system to the terminal in the arrangement of FIG. 1B;

FIG. 22 is a diagrammatic representation of a display message definition defining a particular display message.

A complete description of the invention is set forth in U.S. Pat. No. 4,319,336, the teachings of which are incorporated by reference herein in their entirety. Only selected portions of that description are included hereafter to facilitate an understanding of the claimed invention.

INTRODUCTION

Figure 1A:
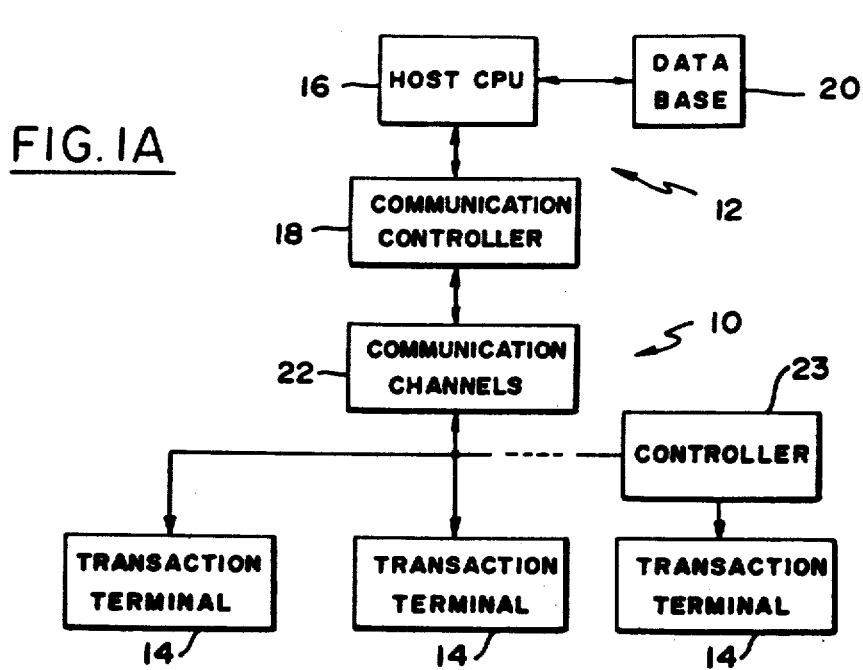
FIG. 1A is a block diagram of a transaction execution system in accordance with the invention.

Referring to FIG. 1A, a transaction execution system 10 in accordance with the invention includes a host data processing system 12 and a plurality of user transaction terminals 14 in communication therewith. The host data processing system 12 includes a host central processing unit 16 such as an IBM system 370, a communication controller 18 such as an IBM 3705 and a data base 20 which may include electrically alterable random access memory, magnetic tape transports, and magnetic disks. The host CPU 16 performs the arithmetic and logical operations which are required for controlling the operation of the host data processing system 12 and processing information which is received through the communication controller 18 or stored in the data base 20. The data base 20 stores information which is related to each customer of the host data processing system 12. For instance, for a banking customer, the data base 20 might store account information for a credit card, savings, checking or other accounts of the bank as well as payroll information and information relating to the financial status of the bank's operations. Each account might be typically addressable in accordance with an account number and have stored therein the current account information such as the current balance, a history of account transactions for a predetermined period of time, encoded personal I.D. numbers for persons who are authorized to use the account, a maximum credit limit, and any other information the bank may wish to store as part of an account. The communications controller 18 acts as an interface between the CPU 16 and a plurality of communication channels 22. The controller 18 arranges information received by the host 12 into a communication discipline and maintains communication synchronization.

The terminals 14 are shown connected directly to the communication channels 20 as via a cable or utility link. Alternatively one or more of the terminals can be coupled to the channels through a local controller 23 such as an IBM 3601 or 3602 having a communication loop as described in previously referred to U.S. Pat. No. 3,956,615 of Anderson et al, the teachings of which are incorporated herein by reference. Where a local controller such as the controller 23 is used, such local controller is capable of functioning in place of the host 12 such as in communicating with the terminal 14 during an interactive step as described hereafter. As such the controller 23 comprises a subhost, and the term "host" as used herein is deemed to include a subhost such as the controller 23 at the terminal end of the communication channels 22.

Figure 1B:
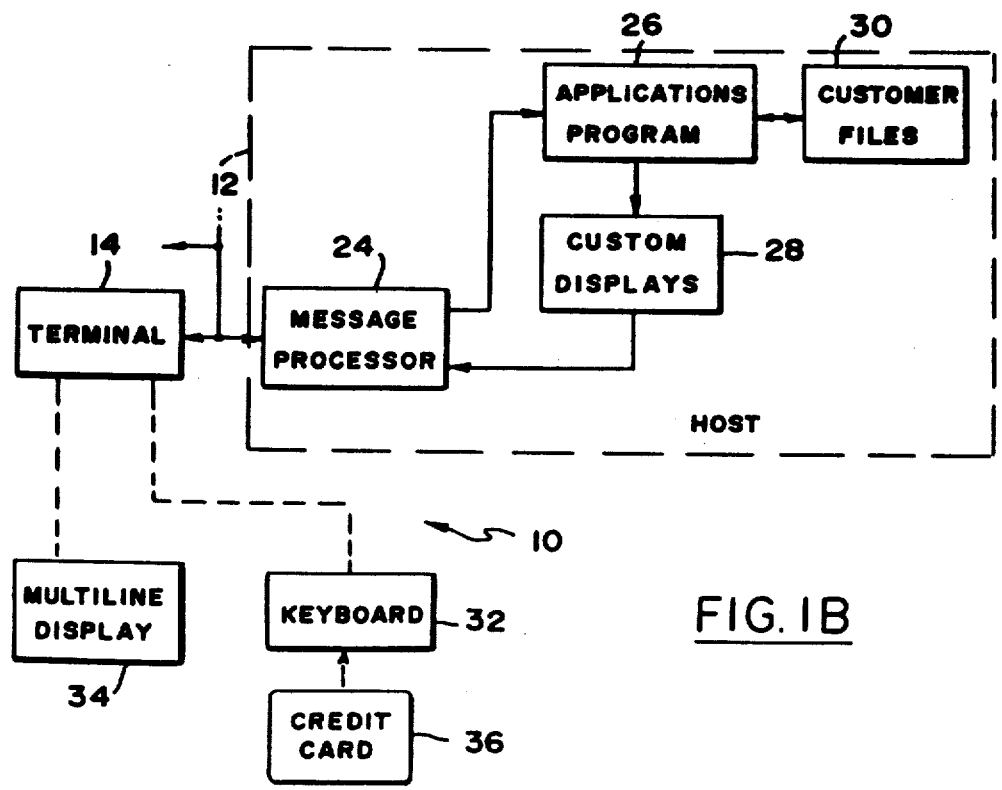
FIG. 1B is a more detailed block diagram of a transaction terminal and the host data processing system of the system of FIG. 1A.

FIG. 1B shows the transaction execution system 10 in somewhat greater detail. The host data processing system 12 is coupled to the various terminals 14 via a message processor 24 which is operative both to receive messages from the terminals and process them for presentation to an applications program 26 and to receive and process custom displays 28 from the applications program 26 for communication to one of the terminals 14. The data base 20 shown in FIG. 1A includes a plurality of customer files 30 as previously described, which files are available for use by the applications program 26.

One of the terminals 14 is shown in FIG. 1B as including a keyboard 32 and a multiline display 34. The keyboard 32 includes keys for requesting transactions and consumer entry of data in connection therewith. The keyboard 32 also includes a card reader capable of receiving a magnetically encoded credit card 36 for entry of both data personal to a particular consumer and data representing a particular financial institution with which the consumer is affiliated.

The previously referred to U.S. Pat. No. 3,956,615 of Anderson et al describes an arrangement for the secure storage and communication of data in which information identifying a particular consumer is encrypted. The encrypted data is compared with stored data within the system to verify the authenticity of the consumer. In an improvement on that system described in Anderson, et al., U.S. Pat. No. 4,186,871, the terminal searches for an entry in a financial institution table based on data from the credit card identifying a particular financial institution. If a corresponding entry is found in the financial institution table, a corresponding key is used to encrypt an account number also taken from the credit card for purposes of comparison with a personal identification number entered by the consumer to verify the consumer's authenticity. If an entry corresponding to the financial institution cannot be found, a search of a virtual financial institution table in the host is made, and if the search is successful the corresponding key is communicated to the terminal for use in encrypting the account number.

In accordance with the present invention the host data processing system 12 and the various terminals 14 combine to provide more versatile and varied transactions both at the terminal and the host level as well as customization of the terminal keyboards, and the messages displayed at the terminals. Customization of the various terminal keyboards such as the keyboard 32 is accomplished in response to data from the credit card 36 identifying a particular financial institution with which the consumer is affiliated. This data is used to identify a selected one of a plurality of different possible states for each of the keys in the keyboard 32. Different sets of key states can be used for different financial institutions, thereby providing for customization of the keyboard 32 for each particular institution.

Each key can have an active or an inactive state, and if active can be standard, data entry or interactive. If a key on the keyboard 32 actuated by the consumer is identified as having a standard state, the transaction is completed at the terminal 14 without participation by the host 12. The terminal 14 does not solicit or receive data from the consumer as part of the transaction.

In accordance with the invention one or more of the keys of the keyboard 32 may be identified as having a data entry state. When a data entry key is actuated, the terminal 14 responds by executing predetermined sequences of steps defined by data stored at the terminal. The steps include displaying predetermined messages to the consumer and receiving data entered by the consumer in response to the messages. Such data interchange usually includes a request by the terminal 14 to the consumer via the display 34 for entry by the consumer of data in connection with the transaction such as by selection of one of a number of choices presented by the display or entry of a dollar amount. Such further consumer data entry may be followed by a display to the consumer requesting verification of the data entered by the consumer and subsequent communication to the terminal 14 by the consumer of such verification. The terminal 14 executes a data entry key transaction utilizing a plurality of predetermined messages previously stored therein by the host 12. The messages together with the data defining the sequences of steps are typically loaded in the terminal 14 during initialization of the terminal by the host, and the host 12 is not thereafter involved in data entry key transactions until the consumer entered data has been collected and the terminal sends a transaction request to the host.

In accordance with the invention actuation of an interactive key on the keyboard 32 results in a transaction which is processed by the host 12 with the help of the terminal 14. As described hereafter direct involvement of the host 12 in such transactions greatly expands the types of transactions that can take place including those in which funds are transferred between different accounts stored in the data base 20. Thus, funds can be transferred between accounts of different consumers to effect bill paying, or can be transferred between two or more accounts of the same consumer such as where funds are to be transferred from the consumer's savings account to his checking account. Actuation of an interactive key at the keyboard 32 results in the terminal 14 communicating a start message for the transaction to the host 12. Upon determination by the applications program 26 that the transaction can be performed, the program 26 determines the interaction needed and communicates a series of display messages to the terminal. The program 26 generates the messages as custom displays 28. Unlike the predetermined messages stored in the terminal 14 and used in conjunction with data entry keys, the applications program 26 has the ability to generate custom displays for a particular transaction or for a particular consumer within a given transaction or transactions.

The terminal 14 responds to each message communicated thereto by the host 12 by displaying the message on the multiline display 34 and receiving consumer entered data in response thereto. The host 12 can respond by such a further display message to the terminal 14, or it can communicate a message that the transaction step is ended.

In accordance with the invention the communication of multiline display messages from the host 12 to the terminal 14 is greatly facilitated by a segmentation technique in which commonly occurring segments of messages are communicated by the host 12 for storage in the terminal 14 prior to execution of transactions. The segments are inserted in the appropriate places within predetermined display messages previously stored in the terminal 14 or custom display messages communicated by the host 12 during an interactive transaction upon display of the message at the display 34. The display messages can incorporate a complete segment stored at the terminal 14 simply by identifying the presence of a segment and the number of the desired segment at the appropriate place within the display message where the segment is to be inserted. The stored segments can themselves refer to and incorporate therein consumer entered data which has been entered and stored in a separate location within the terminal 14.

TERMINAL ORGANIZATION AND KEYBOARD CUSTOMIZATION

Figure 3:
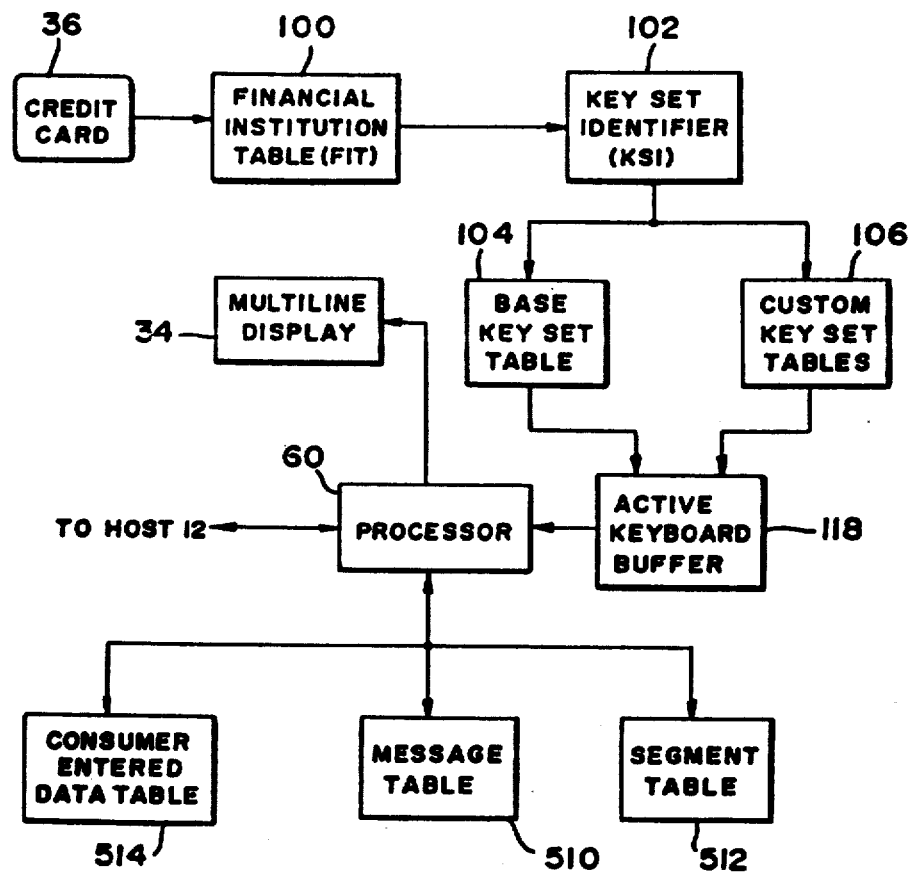
FIG. 3 is a detailed block diagram of a portion of the terminal of FIG. 1B.

FIG. 3 depicts some of the details of the user transaction terminal 14 in accordance with the invention. The terminal 14 includes a financial institution table (FIT) 100 coupled to receive information from the magnetically encoded credit card 36. After the credit card 36 is entered in the terminal 14, the financial institution table 100 is searched for an entry to be associated with the card holder. Each entry in the financial institution table 100 contains a key set identifier (KSI) 102 identifying a key set to be used with the financial institution table entry. When a proper entry is found for the credit card 36 in the financial institution table 100, the corresponding key set identifier field 102 is used to select either a base key set table 104 or any one of a plurality of different custom key set tables 106.

Upon receipt of the interactive start message by the host 12, the message processor 24 relays the interactive start message to the applications program 26. The applications program 26 responds by generating an interactive display message including one or more custom displays and communicating such message via the message processor 24 to the terminal 14. The format of such an interactive display message is shown in FIG. 14.

The host 12 sends an interactive display message to the terminal 14 when it has consumer selection items or option data to display to the consumer. The host 12 is responsible for formatting the information for the display, defining the amount of consumer data entry expected, and controlling the interaction in general.

The Major fields of an interactive display message are:
1. Display related fields which include:
   A. The actual page or screen definition data. This data may be customized page definitions or identification numbers calling out page definitions which reside in the terminal. There may be several pages in a message and there may be a mixture of customized and terminal resident pages in a display message.
   B. An indication of whether the entire selection set is included in the interactive display message.
2. Consumer data entry field, which defines the minimum and maximum length of the consumer entry data.
3. Verification field, which allows the host to to include or identify a special verification message to use with a selection set and thus override the use of a default verification message. The host may also indicate that no terminal verification need take place.
4. Validation/Substitution fields which define a validation list to be searched by the terminal in response to a consumer data entry to determine if such entry is valid or erroneous and substitution data to be substituted for the consumer entered data in the event a match is found in the validation test.

The fields of the interactive display message of FIG. 14 include an L field 440 denoting the length of the message, an ISN field 442 providing the interactive sequence number which is copied from the last ISN received by the host, a C field 444 denoting the class of the message which is "0E" and an SC field 446 denoting the subclass which is "01". A following VAR field 448 provides a copy of the interactive sequence number.

The VAR field 448 is followed by an ID MSG FLAG field 450 which is an interactive display message flag. If bit 8 of this flag has the value "0", this denotes that the host 12 should be contacted for more pages if the consumer enters a change key on display of the last page of the message. If this same bit has the value "1" this denotes that the terminal should wrap to the first page of the display message if the consumer enters the change key on the display of the last page of the message. Bit 9 of this flag, if on, indicates that a verification step should occur after a consumer data entry. Bit 10 of this flag, if on, indicates that the decimal point is being used as a data delimiter (i.e. not a dollars and cents indicator). Bit 11 is a format standardization bit which insures that there are two digits following a decimal point in the amount by adding zeros if necessary. Bit 12 indicates whether consumer data entry is expected. Bit 13 indicates whether or not the substitution data consists of transaction definition bytes. Bit 14 indicates whether or not the transaction is to be cancelled.

The ID MSG FLAG field 450 is followed by a MIN CDEL field 452 and then an MAX CDEL field 454. The MIN CDEL field 452 specifies the minimum consumer data entry length for the selection set. The MAX CDEL field 454 specifies the maximum consumer data entry length for the selection set. If MIN=MAX=0, the only data entry allowed is the "OK" key or another control key. An LP field 456 indicates the total length of page definition data which follows. The page definition data consists of one or more pages, each of which is defined by a page flag field 458 and a page data field 460. Bit 0 of the page flag field 458 comprises a resident page flag. Bit 1 of the field is a verification page flag. If a verification page is present, it must be the first page in the selection set. The page data field 460 is of variable length and may consist of a length indication followed by a text stream.

Where validation or substitution data is present in the interactive display message, the last page data field 460 is followed by an LVS field 462 identifying the presence of such data and an LV field 464 indicating the presence and length of a following VALIDATION DATA field 466 which is of variable length and which contains validation data. If substitution data is also present, a following LS field 468 indentifies the presence and length of a following SUBSTITUTION DATA field 470 which is of variable length and which contains substitution data to be used with the validation data of the field 466. There can be "N" sets of validation and substitution data, each of which includes the LV field 464, the VALIDATION DATA field 466, the LS field 468 and the SUBSTITUTION DATA field 470.

Within the page data field 460 the page ID is the resident page or message table ID number. Page numbers from 1 to 255 are available for display messages and numbers from 1 to 125 are available for printer messages. The following length indication and text stream of the page data field 460 are shown in FIG. 15. The first field 490 thereof denotes the length of the text stream. The fields following the field 490 comprise the text stream. In the example of FIG. 15 the text stream is comprised of three different text and display format control fields 492, 494 and 496 of variable length. The fields 492 and 494 are separated by an RS CODE POINT X'28' field 498 indicating that a resident message segment stored in the segment table of the terminal is to be inserted between the fields 492 and 494. An RES SEG ID field 500 following the field 498 indentifies the segment resident in the segment table of the terminal which is to be inserted between the fields 492 and 494. The fields 494 and 496 are separated by a CDES CODE POINT X'29' field 502 which indicates that consumer entered data is to be inserted between the fields 494 and 496.

Each of the text and display format controls fields 492, 494 and 496 comprises displayable characters in the form of EBCDIC code points not assigned as control characters together with display format control characters.

The display format control characters and the function represented thereby are as follows:

| Function | Control Character | Explanation |
|---|---|---|
| Line Feed | X'25' | The next character position is down one row. The horizontal position is unchanged. If Line Feed is detected while on the last row of the screen, it will cause a wrap to the first row of the screen. |
| Return | X'0D' | The next character position is position 1 on the current display row. |
| New Line | X'15' | The current row is erased from the current position to the end of the row. The next character position is position 1 of the next lower row. If new line is detected while on the last row of the screen, the next character position is position 1 of the first row of the screen. |
| New Page (form feed) | X'0C' | The screen is completely erased; the next character position is position 1 of row 1. |
| Position | X'34' | This control character is followed by a flag byte in a 1-byte positioning value. Flag byte: Bit 4: 0 = position is absolute. 1 = position is relative. Bit 5: 0 = position change is horizontal. |

-continued

| Function | Control Character | Explanation |
|---|---|---|
| | | 1 = position change is vertical. Bits 6-7: 00 = move to new character position without erasing. 01 = erase from the current position the number of bytes specified by the position byte. 10 = move to new character position and erase the old position up to, but not including, the new position. The positioning byte indicates a row or character column number. It contains an unsigned binary value ranging from 0–255 to be used under direction of the flag byte; a 0 results in no operation. The value specified is divided by a modulus number to determine the resulting position. The modulus division produces a change of 1 to x rows for vertical positioning, and a change of from 1 to y character columns for horizontal positioning, where x is the maximum number of rows on a screen, and y is the maximum number of character columns in a row. |

Referring again to FIG. 3 it will be noted that within the terminal 14 the processor 60 is coupled to a message table 510, a segment table 512 and a consumer entered data table 514. Messages communicated to the terminal 14 from the host 12 during initialization are stored in the message table 510. Thereafter the processor 60 controls accessing of the messages in the table 510 for display by the multiline display 34 as the various operations of the transaction are sequenced through. Data entry keys utilize the standardized messages stored in the table 510. During execution of an interactive transaction the host can either utilize the messages stored in the table 510 or it can generate its own custom messages. Commonly used portions of messages are stored in the segment table 512. Each segment comprises a plurality of displayable characters and a plurality of display format control characters for the displayable characters in the same fashion as the fields 492, 494 and 496 of FIG. 15. However the segments do not have to be communicated with or stored with the rest of the display message. Instead, the display message as communicated or stored includes pairs of fields such as the RS CODE POINT X'28' field 498 and the RES SEG ID field 500. The field 498 which comprises the control character X'28' indicates that the following byte is a resident segment ID. The RESIDENT SEGMENT ID field 500 identifies which of the segments stored in the segment table 512 is to be inserted between the fields 492 and 494. During display of the message at the multiline display 34, the processor 60 of FIG. 3 inserts the displayable characters and the control characters therefor comprising the segment from the segment table 512 between the fields 492 and 494 of the message of FIG. 15.

During execution of a transaction, data entered by the consumer is routed by the processor 60 of FIG. 3 to the consumer entered data table 514 where it is stored. Display of the consumer entered data stored in the table 514 is accomplished by inserting the consumer entered data at an appropriate place within a message communicated from the host 12 to the terminal 14 or stored in the message table 510. Insertion of consumer entered data between the fields 494 and 496 in the mmessage of FIG. 15 is provided by the CDES CODE POINT X'29' field 502. The presence of the control character X'29' in the field 502 causes the processor 60 to insert consumer entered data from the table 514 as the message of FIG. 15 is being displayed on the multiline display 34.

The interactive display message of FIG. 14 communicated by the host 12 to the terminal 14 is displayed to the consumer and requests data entry by the consumer. The consumer entered data results in an interactive response message being assembled by the terminal 14 and communicated to the host 12. The interactive response message contains either the data the consumer has entered in response to the display of a selection set or a paging indication in the case where an incomplete selection set has been sent and the consumer wishes to view additional pages of a selection set. The major fields of an interactive response messsage include consumer entry fields and an informational status field.

Displays from a selection set show a consumer a list of selection items from which a consumer is expected to make a selection. Depression of the CHANGE key means that no item on the page displayed was desired and that another page of data should be displayed. The processor 60 will display the next page of the selection set if it is available. A request that more pages be transmitted in an interactive message may be made for an interactive key if no more pages are available at the terminal 14. If the selection set is completely defined at the terminal 14 the first page of the selection set will be redisplayed. For a data entry key the selection set is always completely defined.

Depression of the OK key terminates data entry. An option may be selected where data entries must be terminated by the OK key. This includes depression of the OK key without entering any numerics, which is a null entry, entry of a numeric field of less than the maximum length, as well as entry of a numeric field of the maximum length. If this option is not selected then the OK key will be required only after variable length entries. Data entry will be terminated when the maximum amount of data is entered for fixed length entries, namely when the minimum equals the maximum. The consumer data entry minimum and maximum are established differently for data entry and interactive keys. For data entry keys the minimum and maximum values are established in the key definition table. For interactive keys they are received in the interactive message containing the selection set (display) data. The minimum and maximum values may be different for each selection set for interactive keys since they are established with the definition of the selection set. The minimum and maximum values pertain to the number of characters that may be entered. A decimal point and each numeric digit counts as a character. The minimum value must be greater than or equal to zero and less than or equal to the maximum. The maximum must be greater than or equal to zero and less than or equal to 20. A minimum and maximum value of zero means that no numeric field data is allowed but that the consumer must respond to the display with entry of the OK, CHANGE, or CANCEL key. This setting essentially indicates a view only mode of operation.

During consumer entry of data, any numeric key entry will be accepted. Entering the CORRECTION key will cause the previously entered data to be cleared but data entry is still expected. When data entry is complete it will be checked to insure it falls within the minimum and maximum values established for the key. If the entry is out of range an error message will be displayed and the page viewed by the consumer at the time he entered data will be redisplayed. Data may then be reentered. If a validation list is present for the consumer data entry, the data entry is checked against the list to determine if the consumer data entry is valid or erroneous. If the consumer data entry is found in the validation list and substitution data is present, the substitution data is then substituted for the consumer entered data.

MESSAGE SEGMENTATION INCLUDING MULTILANGUAGE OPTION

As previously described in connection with FIG. 3 standardized messages communicated to the terminal 14 from the host 12 during initialization are stored in a page or message table 510. Customized messages generated by the host as part of an interactive transaction are sent to the terminal for display. Each message, whether standardized or custom, may incorporate one or more message segments stored in a segment table 512. In a multilanguage option shown in FIG. 19, the terminal 14 is provided with a base message table 650, other message tables 652, a base segment table 654 and other segment tables 656. The base message table 650 and the base segment table 654 function in the same manner as and correspond to the message table 510 and the segment table 512 respectively of the arrangement of FIG. 3. However, in addition to the processor 60 being coupled to the base message table 650 and the base segment table 654 for operation in the manner described in connection with FIG. 3, the processor 60 is also coupled to a language table 658 which makes possible various different combinations of the message tables 650 and 652 and the segment tables 654 and 656.

The multilanguage option allows a display message table and/or segment table to be associated together and selected for use during a transaction or transaction chain. At the end of a transaction or transaction chain the base message table 650 and/or base segment table 654 is used. The language table 658 contains entries which associate a message table and a segment table. The language table 658 contains as many entries as required to define all the message and segment table combinations to be used at the terminal 14.

Figure 19:
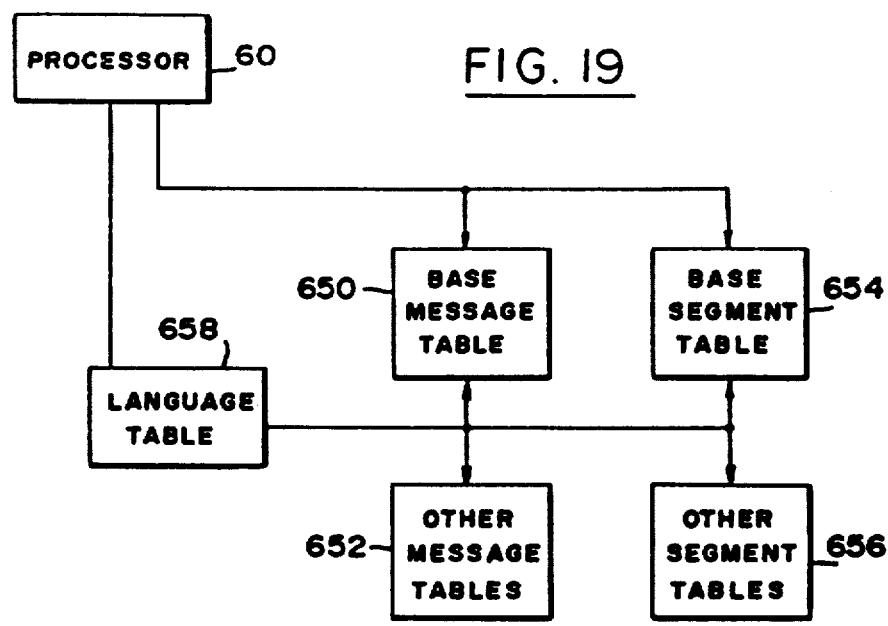
FIG. 19 is a block diagram of a portion of the terminal of the arrangement of FIG. 1B used in a multilanguage option.

The options provided by the arrangement of FIG. 19 are useful in situations such as where transaction processing is to be made available in two or more different languages. Various countries and various parts of countries include people who speak two, three or more different languages. In such instances a consumer is able to request transactions in his native language using his credit card or by choosing from a display menu of languages. The language table 658 responds to the credit card data by selecting the appropriate message table and segment table for that language.

To select one of the other message tables 652 instead of the base message table 650 or one of the other segment tables 656 rather than the base segment table 654, fields must be present in the financial institution table 100 shown in FIG. 3 that identify either or both a language ID (LID or the location of the language ID on the credit card) and an institution message ID (IMI). The LID allows entry selection based on the language. The IMI allows entry variation based on institution needs. An example is when a savings and loan wants different messages from a bank which may reference checking accounts, and so on. Using both parameters allows entry selection based on institution and language needs.

Figure 20:
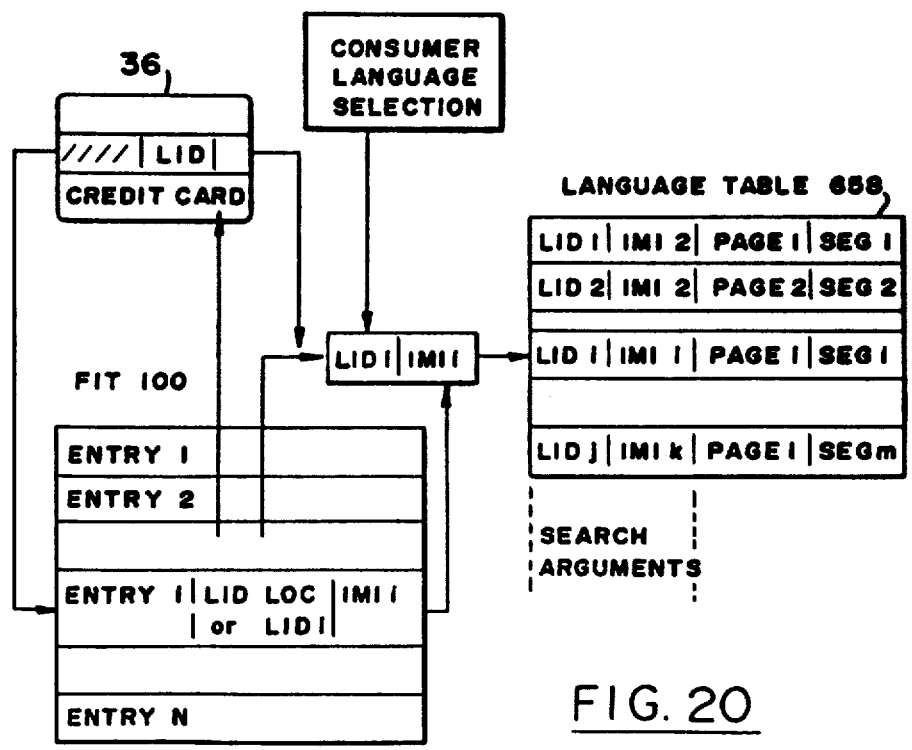
FIG. 20 is a detailed block diagram of a portion of FIG. 19.

An alternate form of operation can be used when the language code is located on the credit card and two institutions joining together in a pool use the same language code value but want to use different tables. Each institution is assigned different institution message identifiers (IMI) which allows each institution to use its own set of tables even though the institutions are using the same language code. Thus, neither institution needs to reissue its cards because of a language code conflict. Referring to FIG. 20 which shows the language table 658 in greater detail in conjunction with the financial institution table 100 and a credit card 36, when the credit card 36 is entered the financial institution table 100 is searched for an associated entry. At the host's option the consumer may choose a language from a list displayed at the terminal. This will override the language specified on the card or in the FIT. If the associated entry specifies a LID and/or IMI, then the LID and/or the IMI are used to identify an entry in the language table 658 to be used for the transaction or transaction chain. The language table 658 selects the appropriate message (page) table and segment table.

The message table number and the segment table number can be any decimal integers in the range 1-9. Either or both the LID and the IMI may have default values (which are 0). The default LID and IMI use the base message table 650 and the base segment table 654. A default IMI means that the language table 658 is searched for an LID match only. Conversely, a default LID means that the language table 658 is searched for an IMI match only.

It is occasionally desired to change one or more of the messages stored in the message table 510 within the terminal 14 rather than to replace the message with a new one. To accomplish this the applications program 26 within the host 12 generates and communicates to the terminal 14 a change display message command. The format of such a message is shown in FIG. 21. The format includes an L field 750 denoting the length of the message, an N field 752 providing the transaction sequence number, a C field 754 providing the class which is "X'OC'" and an SC field 756 which indicates the subclass which is "X'OF'". A C2 field 758 contains the value of the second bill counter where there are two bill counters at the terminal. The following C/SC field 760 denotes concatenation of class and subclass "X'CF'". The following C1 field 762 contains the value of the first bill counter. The following MN field 766 provides the message number which is a one byte binary field containing the message number of the message to be replaced in the message or segment table indicated. The following ML field 768 denotes the message length in terms of the number of bytes of the message field. This value may not exceed 238. The following MSG field 770 contains the message. This is a variable length EBCDIC field that contains the new page or segment that is to replace the page or segment in the table indicated. A following FLAG field 772 indicates whether the MN field represents a page number or a sequent number. An IMI field 774 at the end of the message is the message table identifier which is used in conjunction with the SPEC field 764 which contains the language identifier to search the language table for an entry. An entry has the address of the page or segment table where the message is to be changed. Bit 0 of the FLAG field 772 indicates whether a page or segment is to be changed.

Display message segmentation in accordance with the invention in which often repeated segments of messages are stored at the terminal for ready incorporation into messages communicated to the terminal from the host provides a number of advantages. Such advantages include the reduction of the amount of local storage required in the terminal to store the display messages, a reduction of the number and size of communication messages required to complete an interactive transaction, a reduction of the time delays introduced by transmission of long interactive messages, and assistance in customization of multiline display messages. Changing the contents of a segment definition changes the display messages containing the segment. Thus, promotional messages or time and temperature data which change oover time and appear in more than one display message can be changed by altering the specific segment data without the requirement to individually change each display message that contains the information.

In the present example the multiline display 34 includes a screen capable of displaying six lines of 40 characters each or up to 240 characters. In an interactive environment where the host communication message has a maximum length of 250 bytes, it is important to pack as many display message definitions as possible in a single communication message in order to avoid multiple interactive message sequences for a single related set of data items. Segmentation provides a means of shortening custom display definitions so that more than one can be contained in each communication message. This minimizes the number of communication messages required to complete an interactive transaction.

As noted in connection with FIG. 15 the text stream portion of a display message may include displayable characters, display format control characters, segmentation control characters and CDES (consumer data entry) control characters. These elements can appear in any order in the text stream. The displayable characters are EBCDIC code points equal to or greater than X'40'. Undefined control characters are EBCDIC code points less than X'40' that are not assigned as CDES control characters, resident segment control characters or format control characters. When encountered in a display message definition, undefined control characters are displayed as a solid box the size of the dot matrix.

Displayable characters are defined by EBCDIC code points equal to or greater than X'40'. Up to 227 displayable characters may be defined in the character set. A page definition consisting entirely of displayable characters results in the first character of the string being placed in the upper left corner of the display with succeeding characters being placed in sequence from left to right and from top to bottom on the display. When the maximum number of characters has been placed on a line, succeeding characters are placed at the leftmost character position of the next line. After the screen has been completely filled, any additional characters are placed beginning at the upper left character position of the screen with succeeding characters being placed according to the character positioning rules described above. In this mode of operation, "space" characters are included in the proper places to provide the desired display appearance.

The format control characters provide a method for positioning strings of displayable characters, thereby removing the need to use "space" characters to format a display message and therefore resulting in a corresponding decrease in the size of the display message definition. As previously noted, the format control characters include line feed, return, new line, new page and position select.

As previously noted, each segment consists of displayable characters, format control characters and in some cases a consumer data entry segment (CDES) control character. Segments represent phrases, lines, partial display message definitions, or boiler plate information available for use as building blocks in complete display message definitions. Each resident segment (RS) in the segment table 512 is assigned a unique segment identifier. Up to 255 segments may be stored in the segment table 512. These segments can be included in display message definitions by using the resident segment control character which is contained in the field 498 in the example of FIG. 15. The byte following the control character is interpreted as a segment I.D. and is contained in the field 500 in the example of FIG. 15. When encountered in a display message definition, the resident segment identified by the resident segment control character/segment I.D. pair is logically inserted in the display message definition. The resident segment is treated as if it had been explicitly included in the display message definition. After the resident segment has been interpreted, processing returns to the original display message definition. Any number of segments can be included in a display message definition.

A resident segment definition may not contain a resident segment control character. This prevents segments from including other resident segments as part of their definitions, thereby eliminating circular segment definitions which might otherwise occur.

The consumer data entry segment (CDES) control character represents buffer space available for data to be entered by the consumer via the keyboard. Again referring to the example of FIG. 15, the CDES control character is contained in the field 502. Occurrence of the CDES control character causes the terminal to refer to the consumer entered data table 514 and to insert any consumer entered data stored therein into the message. The length of the CDES data is determined by the maximum amount of digits the consumer is allowed to enter in a given situation. Unentered digits up to the maximum will be displayed as spaces. After the CDES has been interpreted, processing returns to the original page definition.

A typical six line display message is as follows:

| ENTER CODE AND PRESS OK KEY |
| --- |
| 105 - ORDER CHECKS |
| 63 - PAY TELEPHONE BILL |
| 41 - MAKE HOME MORTGAGE PAYMENT |
| 6 - MAKE AUTOMOBILE LOAN PAYMENT |
| FOR OTHER CHOICES, PRESS CHANGE KEY |

This type of message is sent to the terminal 14 by the host 12 as the result of the consumer selecting a transaction key specified as interactive and the terminal 14 notifying the host 12 of the transaction key selected. Each of the six lines of this message is stored as a separate segment in the segment table 512.

The display message definition for the six line display noted above and which would be stored in the message table 512 is shown in FIG. 2. The definition of FIG. 22 includes an L field 800 denoting that the message definition is 16 bytes in length. The following NP field 802 comprises a new page control character. This results in clearing of the screen and readying of the display to begin printing characters in the upper lefthand corner of the screen. The following RS field 804 contains a resident segment control character which is followed by the segment I.D. in field 806. A following CDES field 808 contains a consumer data entry segment control character indicating the maximum number of spaces that can be reserved. The following NL field 810 is a new line control character indicating that the next line of the display is to be addressed. The remainder of the message definition of FIG. 22 consists of pairs of bytes denoting the five remaining segments in the message. The first byte of each pair comprises the resident segment control character, and the second byte of each pair is the segment I.D. number.

The first line of the six line display example noted above which reads "ENTER CODE AND PRESS OR KEY" is a general guidance line used with every display requesting selection by the consumer. Line 6 which reads "FOR OTHER CHOICES, PRESS CHANGE KEY" is a special guidance line required whenever the list of choices exceeds the one page screen capacity. The second through the fourth lines which read "105-ORDER CHECKS; 63-PAY TELEPHONE BILL AND 41-MAKE HOME MORTGAGE PAYMENT" represent a subset of the special financial transactions provided by the card issuing institution. The subset has been customized to those transactions applicable to the consumer currently using the machine.

An appreciation of the saving in transmission time and storage space required can be gained when it is considered that the message definition of FIG. 22 consists of only 16 bytes. Line 1 of the message by itself would require 32 bytes if segmentation were not available. The length of the display definition required to define the entire six line message without the use of segmentation is 187 bytes. Whereas only one message definition 187 bytes in length could be included in an interactive display message which permits a maximum of 256 bytes, over ten display messages in the 16–20 byte range can be included in one interactive display message from the host.

The invention can be better understood by considering an example of an interactive transaction together with the various messages displayed in connection therewith. Initially, the prior transaction has ended and the terminal 14 has sent a status message to the host 12. The terminal 14 displays the following message, which was previously generated by the host 12, to the consumer:

1 INSERT CREDIT CARD TO BEGIN TRANSACTION
2 GOOD DAY
3 DATE: OCT. 14, 1977
4 WEATHER: 40% CHANCE OF RAIN TODAY
5 NEWS: YANKEES WIN WORLD SERIES
6 USE OUR NEW ATM LOCATED

IN OAKRIDGE MALL

The consumer responds to the message by inserting his credit card. The credit card is read by the terminal 14 which fails to find an entry in the financial institution table 100. The terminal 14 sends a message to the host 12 requesting search of a virtual financial institution table within the host. In the meantime the terminal 14 displays the following message to the consumer:

```
1 WAIT - YOUR CARD IS BEING PROCESSED
2 WE PLAN TO INSTALL MORE 'MONEY TREE'
3 MACHINES IN THIS AREA. LET US KNOW
4 WHERE YOU THINK THEY SHOULD BE
5 LOCATED
6 USE OUR NEW ATM LOCATED
  IN OAKRIDGE MALL
```

The host 12 finds an entry in the virtual financial institution table for the credit card and sends the entry to the terminal 14. The terminal 14 responds by processing the fields of the entry and sending a status message to the host 12. The terminal 14 then displays the following message to the consumer:

```
1 KEY PERSONAL IDENTIFICATION NUMBER
2
3
4
5
6 USE OUR NEW ATM LOCATED
  IN OAKRIDGE MALL
```

The consumer responds by entering his personal identification number (PIN). The terminal 14 validates the PIN and displays a function select message to the consumer as follows:

```
1 CHOOSE TRANSACTION TYPE - USE BLUE KEYS
2
3
4
5 WE ARE OPEN SATURDAYS FROM 10:00 AM TO
6 1:00 PM
```

In the present example the consumer responds by choosing the "ADDITIONAL FUNCTION" transaction key which is determined to be an interactive function key. The terminal 14 sends an interactive start message to the host 12. The host 12 responds by sending an interactive display message to the terminal 14. The terminal 14 responds by displaying the first page of selection set 1 of the interactive display message which is as follows:

```
1 ENTER TRANSACTION CODE
2 001 - ORDER CHECKS
3 002 - PAY TELEPHONE BILL
4 003 - PAY WATER BILL
5 004 - PURCHASE SAVINGS BOND - SERIES F
6 FOR OTHER CHOICES, PRESS CHANGE KEY
```

The consumer responds to this message by actuating the "CHANGE" key. The terminal then displays the second page of selection set 1 of the interactive display message as follows:

```
1 ENTER TRANSACTION CODE
2 005 - PURCHASE SAVINGS BOND - SERIES E
3 006 - PAY HOME MORTGAGE
4 007 - PAY AUTO LOAN
5 008 - PAY GAS AND ELECTRICITY BILL
6 FOR OTHER CHOICES, PRESS CHANGE KEY
```

The consumer responds to this message by entering "005" indicating that he wishes to purchase saving bonds. The terminal 14 receives the consumer entered data and displays the following verification message:

```
1 YOU KEYED IN 005
2 PRESS "OK" TO CONFIRM
3 PRESS "CORRECTION" TO REENTER
4
5
6
```

The consumer actuates the "OK" key, and the terminal 14 responds by communicating the previously entered data requesting purchase of savings bonds to the host 12 as part of an interactive response message. The host 12 sends an interactive display message with more display data in the form of selection set 2 to the terminal 14. The terminal 14 displays page 1 of selection set 2 requesting choice of bond denomination. This display is as follows:

```
1 ENTER BOND DENOMINATION
2 $25.00
3 $50.00
4 $75.00
5 $100.00
6 $500.00
```

The consumer responds by entering "50.00". The terminal 14 then displays the following verification message:

```
1 YOU ENTERED 50.00
2 PRESS "OK" TO CONFIRM
3 PRESS "CORRECTION" TO REENTER
4
5
6
```

The consumer actuates the "OK" key, and the terminal 14 responds by transmitting the previously entered data selecting $50.00 denominations to the host 12. The host then sends an interactive display message containing more display data in the form of selection set 3, and the terminal 14 displays page 1 of selection set 3 which requests the number of bonds to be purchased and which is as follows:

| 1 | KEY IN NUMBER OF $50 BONDS | | | | | |
|---|-----|---------|-----|---------|-----|---------|
| 2 | NO. | COST    | NO. | COST    | NO. | COST    |
| 3 | 1   | $37.50  | 5   | $187.50 | 9   | $337.50 |
| 4 | 2   | $75.00  | 6   | $225.00 | 10  | $375.00 |
| 5 | 3   | $112.50 | 7   | $262.50 | 11  | $412.50 |
| 6 | 4   | $150.00 | 8   | $300.00 | 12  | $450.00 |

The consumer responds to the message by entering "30". The terminal 14 responds by displaying the following verification message:

```
1 YOU ENTERED 30
2 PRESS "OK" TO CONFIRM
3 PRESS "CORRECTION" TO REENTER
4
5
6
```

The consumer realizes he has made a mistake in entering "30" and actuates the "CORRECTION" key, resulting in redisplay of the following message:

| 1 | KEY IN NUMBER OF $50 BONDS | | | | | |
|---|---|---|---|---|---|---|
| 2 | NO. | COST | NO. | COST | NO. | COST |
| 3 | 1 | $37.50 | 5 | $187.50 | 9 | $337.50 |
| 4 | 2 | $75.00 | 6 | $225.00 | 10 | $375.00 |
| 5 | 3 | $112.50 | 7 | $262.50 | 11 | $412.50 |
| 6 | 4 | $150.00 | 8 | $300.00 | 12 | $450.00 |

The consumer responds to this message by entering "3". The terminal 14 responds by displaying the following verification message:

```
1 YOU ENTERED 3
2 PRESS "OK" TO CONFIRM
3 PRESS "CORRECTION" TO REENTER
4
5
6
```

The consumer actuates the "OK" key, and the terminal 14 responds by communicating the request for purchase of three bonds to the host 12 in an interaction response message. The host 12 sends an interactive display message with more display data in the form of selection set 4. The terminal 14 displays the first page of selection set 4 which requests entry of "FROM ACCOUNT" information and which is as follows:

```
1 KEY IN ACCOUNT NUMBER TO BE BILLED
2 010 CHECKING
3 020 SAVINGS
4 030 SPECIAL ACCOUNT #417638
5 040 MASTER CHARGE
6 050 VISA
```

The consumer responds to this display by entering "30". The terminal 14 then displays the following verification message:

```
1 YOU ENTERED 30
2 PRESS "OK" TO CONFIRM
3 PRESS "CORRECTION" TO REENTER
4
5
6
```

Th consumer responds to this message by actuating the "OK" key. The terminal 14 sends the latest consumer entered data to the terminal 14 as part of an interactive response message. In the meantime the terminal 14 displays the following message to the consumer:

```
1 PLEASE WAIT - YOUR REQUEST IS BEING
2 PROCESSED
3
4
```

```
5 OPEN A $600 TIMED SAVINGS ACCOUNT AND
6 RECEIVE A COLOR TV. CALL US TODAY!
```

The host then sends an interactive completion message to the terminal, and the terminal sends a transaction request to the host. The host 12 then sends a transaction reply message to the terminal 14 containing the following transaction verification message which is displayed by the terminal 14:

```
1 YOU ARE BUYING 3 $50, SERIES E BONDS
2 AT A TOTAL COST OF $112.50
3 FROM SPECIAL ACCOUNT #417638
4 HIT OK TO PURCHASE BONDS
5 PRESS CANCEL TO CANCEL TRANSACTION
6
```

The consumer responds by actuating the "OK" key, thereby terminating the transaction.

It will be appreciated by those skilled in the art that transaction execution systems in accordance with the invention increase an institution's functions on two levels. First, they provide a functional increase to the owning institution, allowing it to provide more services to its own consumers. Secondly, the invention provides the basis to allow this functional increase to be enjoyed by pools of institutions. The formation of pools is desirable because it allows the cost of a terminal to be shared across several institutions. The invention facilitates the development of pools by enabling each institution to customize its transactions as it desires without the need to have its own terminal.

The multiline display allows an individual display to be more informative to the consumer, thus making it easier for the consumer to use the terminal. The display also provides an institution for capability of displaying promotional messages or information about new procedures or hours which may be important to the consumer. Furthermore, the display opens the way for more complex transactions to take place since these may require more instructional information to be given to the consumer.

The data entry key function allows an increase in function at a minimal cost to the institution. A greater variety of transaction types and choice of accounts are possible without a significant increase in the complexity of the system or in communications line time.

The interactive function enables a system to provide an almost limitless variety of transactions to its consumers. In addition, it allows personalization of transactions to a consumer.

The segmentation feature used in conjunction with the multiline display is advantageous with respect to the various features noted above in that it optimizes the storage and transmission of the longer display messages.

For a pool of institutions, systems in accordance with the invention allow customization of the availability of transaction types and hence the variety of options it wishes to describe to the consumer. Furthermore, the content of the displays to the consumer can be customized. Thus institutions A and B may have their own promotional messages even though they are operating on the same terminal. The ability to customize both transaction types available and display contents allows any member of a pool to enjoy all of the features described previously for an individual institution.

As noted above the interactive function makes the kinds and types of transactions that can be performed almost limitless. Some of the possible transactions include the following:

1. Electronic Bill Payment—Funds can be transferred from any account to any cooperating bill collector.
2. Split Deposit—A check can be deposited with funds being withdrawn from that same check.
3. Purchase of Savings Bonds—As seen in the above example such things as savings bonds can be purchased in a variety of denominations.
4. Account Balance Information—Information on all accounts at a bank can be obtained.
5. Loan Status—Inquiry can be made as to the status of all loans with a bank. A breakdown on any individual loan can be obtained including such information as interest and principal paid. Additional payments to principal can be made.
6. Check Ordering—More checks can be ordered by the consumer.
7. Fund Transfers Between Accounts—Funds can be easily transferred between accounts, facilitating such things as the transfer of funds into a Christmas Club account or a children's savings account.
8. Display Variety—General information displays can be made up to describe things such as how to use the terminal, bank hours available, stock market reports, weather reports, types of loans available from a bank, interest rates, lengths of loans, minimum monthly payments and how to open an account.
9. Loan Application—Typically, the institution has much of the information about the consumer already needed to process a loan application so that all that may be needed is the amount and length of a loan and the reason for the loan (i.e. car, home improvement, personal). Furthermore, the terminal and its variety of displays can be used to request and extension on an existing loan. In the case of a loan application, the institution takes the information resulting from the transaction and prepares the loan application papers which are then sent to the consumer for approval.
10. Tax Preparation Aid—Consumers can request a printout of tax related information such as interest paid on loans and interest received on savings accounts, requiring minimal teller intervention. This information is easily gathered and mailed to the consumer.

While the invention has been particularly shown and described with reference to a preferred embodiment thereof, it will be understood by those skilled in the art that various changes in form and details may be made therein without departing from the spirit and scope of the invention.

What is claimed is:

1. A terminal for use in a transaction execution system which includes said terminal remote from and in communication with a host data processing system, said terminal comprising:
    means operable by a customer for selecting a transaction step;
    segment storage means for storing a plurality of message segments;
    message storage means for storing a host message received from said host data processing system, said host message selectively including one or more message segment identifiers;
    execution means for executing said selected transaction step including means for generating from a host message pertaining to said selected transaction step at least one display message selectively by replacing each message segment identifier with a corresponding message segment selected from said segment storage means by said message segment identifier; and
    display means for displaying said at least one display message to said customer.

2. The terminal of claim 1 further comprising: communication port means for receiving said host message from said host data processing system.

3. The terminal of claim 1 further comprising means operable by said customer for entering customer selected data; and wherein said host message further selectively includes a data marker and said execution means is responsive to said data marker for inserting said customer selected data into said at least one display message.

4. The terminal of claim 1, wherein said message storage means further includes means for storing a plurality of predetermined messages received from said host data processing system; said terminal further including means operable by said customer for entering institution indicia identifying an institution with which said customer is associated; and wherein said execution means is selectively responsive to said institution indicia for selecting from said message storage means at least one predetermined message for display to said customer in response to customer selection of said transaction step.

5. The terminal of claim 1 further comprising:
    means operable by said customer for entering institution indicia identifying an institution with which said customer is associated;
    said means for selecting further comprising a plurality of transaction selection keys representing different transaction steps selectively actuable by said customer;
    communication port means for communicating an interactive request message to said host data processing system and for receiving in an interactive response message said host message from said host data processing system;
    said message storage means further including means for storing a plurality of predetermined messages;
    means responsive to said institution indicia for designating a first transaction selection key as an interactive key and a second transaction selection key as a data entry key;
    means responsive to said institution indicia and (a) to actuation by said customer of said data entry key for selecting a predetermined message from said message storage means, and (b) to actuation by said customer of said interactive key for generating said interactive request message for communication to said host data processing system requesting said interactive response message containing said host message.

6. A transaction execution system which includes a plurality of terminals, each terminal remote from and in communication with a common host data processing system, characterized in that
    the host data processing system comprises:
        means for generating a host message, said host message selectively including one or more message segment identifiers;
        means for communicating said host message to one of said terminals; and
    said one of said terminals comprises:

means operable by a customer for selecting a transaction step;

segment storage means for storing a plurality of message segments;

communication port means for receiving said host message from said host data processing system;

message storage means for storing said host message;

execution means for executing said transaction step including means for generating from said host message at least one display message by replacing each message segment identifier with a message segment selected from said segment storage means by said each message segment identifier; and display means for displaying said at least one display message to said customer.

7. The system of claim 6, wherein said means for selecting further comprises a plurality of transaction selection keys representing different transaction steps selectively actuatable by said customer; said terminal further comprising means operable by said customer for entering institution indicia identifying an institution with which said customer is associated; means responsive to said institution indicia for designating a first transaction selection key as an interactive key and a second transaction selection key as a data entry key; said execution means further being selectively responsive to actuation by said customer of said data entry key for generating said display message from said host message stored in said message storage means, and selectively responsive to actuation by said customer of said interactive key for obtaining said display message from said host data processing system.

* * * * *